United States Patent [19]

Merle

[11] Patent Number: 4,969,729

[45] Date of Patent: * Nov. 13, 1990

[54] COMPOSITE PLASTIC LENS HAVING A POSITIONED OPTICAL AXIS AND METHOD OF MAKING THE SAME

[75] Inventor: Joseph Merle, Miami Beach, Fla.

[73] Assignee: 501 Opticast International Corporation, London, England

[*] Notice: The portion of the term of this patent subsequent to Jan. 9, 2007 has been disclaimed.

[21] Appl. No.: 332,630

[22] Filed: Apr. 3, 1989

Related U.S. Application Data

[63] Continuation-in-part of Ser. No. 234,090, Aug. 19, 1988, Pat. No. 4,892,403.

[51] Int. Cl.$^5$ .......................... G02C 7/06; G02C 7/14
[52] U.S. Cl. ........................ 351/168; 156/99; 156/153; 156/629; 350/417; 351/159; 351/166; 351/169; 351/172; 351/175; 351/176; 351/177
[58] Field of Search ............... 351/177, 166, 168, 169, 351/175, 170, 171, 172, 159; 350/417; 156/99, 153, 629

[56] References Cited

U.S. PATENT DOCUMENTS

| | | | |
|---|---|---|---|
| 3,588,216 | 6/1971 | Bloom | 351/49 |
| 3,620,888 | 11/1971 | Buzzell | 351/49 |
| 3,711,417 | 1/1973 | Schuler | 351/166 |
| 3,877,798 | 4/1974 | Tolar et al. | 351/168 |
| 3,940,304 | 2/1976 | Schuler | 264/2 |
| 4,645,317 | 2/1987 | Frieder et al. | 351/168 |
| 4,679,918 | 7/1987 | Ace | 351/159 |
| 4,690,512 | 9/1987 | Forsyth | 350/417 |
| 4,892,403 | 1/1990 | Merle | 351/177 X |

Primary Examiner—Scott J. Sugarman
Attorney, Agent, or Firm—Eckert, Seamans, Cherin & Mellott

[57] ABSTRACT

The composite plastic lens includes an anterior plastic lens having a first corrective feature and a posterior plastic lens having a second corrective feature. One of the lenses, preferably the anterior lens, may have an optical center axis that is decentered with respect to the geometric center axis of the lens. That lens is prism-shaped. Both lenses are disposed atop one another such that when their optical center axes are combined, the resultant optical center axis or principal axis of the composite lens is at a predetermined position relative to the bifocal, multifocal or progressive lens feature carried by the anterior lens. The anterior and posterior lenses are joined together by an adhesive that bonds opposing, etched surfaces of those lenses. The method of making the composite plastic lens includes, in one embodiment, the steps of etching the front and rear surfaces of the posterior and anterior lenses and bonding those etched surfaces together with an adhesive. The adhesive is placed between the lenses while the lenses are angularly disposed with respect to the horizontal. Thereafter, the lenses are floated on a heated fluid to cure the adhesive. By heating the lenses prior to bonding, the posterior and anterior lenses return to their original shape and curvature.

24 Claims, 3 Drawing Sheets

COMPOSITE PLASTIC LENS HAVING A POSITIONED OPTICAL AXIS AND METHOD OF MAKING THE SAME

This is a continuation-in-part of U.S. Pat. application Ser. No. 234,090, filed Aug. 19, 1988 now U.S. Pat. No. 4,892,403.

BACKGROUND OF THE INVENTION

The present invention relates to a composite plastic lens made of two thin lenses with their optical centers axes being such that the resultant optical center axis of the composite lens is at a predetermined location with respect to the near vision or bifocal lens region and a method for making the composite lens.

It is known in the eyeglass industry that plastic lenses can be molded in shapes to provide prescription lenses. These prescription lenses incorporate a corrective feature that alters light rays passing through the lenses. As used herein, the term "corrective feature" refers to an aspect of the lens that corrects for eyesight deficiencies. The term "optical center axis" is an imaginary line through the optical center of the lens which is normal or perpendicular to the lens. The optical center axis is the same as the main or principal axis of the lens.

Optical laboratories have been established which maintain a large quantity of plastic lenses having certain corrective features. Sometimes the lenses have to be ground and polished to match a prescription of a patient. At other times, the lab maintains a large stock of prescription lenses and the lenses are simply cut or edged and mounted in an eyeglass frame for the patient. The power of a lens is often times designated as a spherical power. Typical prescriptions for eyeglasses include +2.5, +1.25, +0.5, −0.75 and −3.00 and numerous other values. The plus sign in the spherical value designates a positive lenses. The negative sign designates a negative lens. In an eyeglass prescription, spherical value corrects for far or near vision deficiencies. The lab may maintain a stock of lenses that includes bifocal, multifocal or progressive vision lenses. These lenses correct for near vision deficiencies. Eyeglass prescriptions to correct for near vision deficiencies, such as bifocals, are designated ADD 1.25, ADD 2.25, ADD 3.00 and many other values. A number of patients can use this type of stock lenses without any grinding and polishing. However, a sizable percentage of the population requires lenses that correct for far vision, near vision and astigmatism. Astigmatism is corrected by using a cylinder lens that is rotated with respect to the horizontal to correct for the patient's astigmatism. The degree of the astigmatism varies from patient to patient and the lens must be carefully manufactured and positioned in the frame to correct for the astigmatism. Therefore, it is not practical for the optical lab to maintain stock lenses for typical corrective vision problems (far vision problems) as well as for the great variations of a astigmatism, and with near vision corrective lenses. Accordingly, it is customary in this industry to grind corrective lenses for astigmatic patients who require multifocal lenses. Eyeglass prescriptions to correct for astigmatism are designated with a spherical value, e.g. +1.50, a cylindrical value, e.g., −2.00 and an angular displacement off the horizontal that is called "the axis", e.g. 45°. Accordingly, an astigmatic lens must have a power and an angle, for example −1.00 sph., −0.75 cyl. axis 100°.

If a person has near vision, far vision and astigmatic problems, the eyeglass prescription may be +2.50/−2.00 axis 110° ADD +3.00.

U.S. Pat. No. 4,645,317 to Frieder, et al., discloses eyeglass lens modules and methods for making those modules. This patent discloses the use of plastic, corrective single vision stock lenses on which is glued a veneer overlay having a plus diopter bifocal or trifocal corrections. The veneer overlay must have a posterior curvature similar to the anterior curvature of the single vision stock lens which make the lens too thick. The veneer overlay is laminated or glued to the stock lens. However, Frieder, et al., do not disclose the use of two plastic lenses that cannot be used individually as corrective lenses because such lenses are too thin, do not disclose etching opposing surfaces of anterior and posterior plastic lenses, and do not disclose the use of heat to cause the lenses to return to their original shape after a deforming force is applied to the lenses. U.S. Pat. No. 4,690,512 to Forsyth discloses a composite lens assembly for two plastic lenses. Glue or optical cement is placed between the lenses in a gap of uniform width. Forsyth discloses the use of a primer comprising an aliphatic polyurethane. Forsyth states in the patent "While no explanation can be furnished for the superior results obtained by the use of the described priming layer on the surface 14 of the plastic lens element 10 as described, it is assumed that the lacquer applied to the surface of the plastic lens influences the molecular structure in such a manner that a firm and stable bond with the silicone adhesive used is established which as experience has shown does not occur in the absence of the primer". At column 3, lines 58–66. Forsyth does not disclose etching opposing services of the plastic lens nor using an adhesive or glue that has the same index of refraction as the posterior and anterior plastic lenses U.S. Pat. No. 3,877,798 to Tolar, et al., discloses a laminated multifocal lens. One of the lens is a bifocal or a multifocal lens and the other lens is a lens to correct for astigmatism. The lenses are glued together by an optical adhesive. Tolar, et al., do not disclose the step of etching surfaces of anterior and posterior lenses nor the use an adhesive that has an index of refraction equal to the index of refraction of the lenses. Tolar, et al., also do not disclose the use of heat to return the lenses to their original shape after the potentially deforming action of spreading the glue between the lenses. U.S. Pat. No. 3,711,417 to Schuler discloses plastic laminated lenses. However, these lenses are not etched prior to bonding together.

U.S. Pat. Nos. 3,620,888 to Buzzell; U.S. Pat. No. 3,588,216 to Bloom; U.S. Pat. No. 3,940,304 to Schuler; and, U.S. Pat. No. 4,679,918 to Ace disclose various composite lenses without disclosing etching of the lenses or heating of the lenses.

U.S. Pat. No. 4,522,768 to Roscrow discloses a casting gasket assembly and method for casting plastic lenses therefrom. The patent discloses a method and apparatus for casting plastic lenses. The disclosure of the Roscrow patent is incorporated herein by reference thereto.

OBJECTS OF THE INVENTION

It is an object of the present invention to provide a composite plastic prescription lens made of two thin lenses each having a corrective feature.

It is another object of the present invention to provide a composite plastic lens that is not capable of being delaminated.

It is a further object of the present invention to provide a composite plastic lens that is made of etched anterior and posterior lenses that are bonded together.

It is a further object of the present invention to provide a composite plastic lens made of two lenses that are heated prior to bonding to return those lenses to their original shapes thereby eliminating optical waves and distortion in the composite lens.

It is a further object of the present invention to provide a method of manufacturing the composite plastic lens.

It is another object of the present invention to provide a composite plastic lens wherein the main or principal axes of the anterior and posterior lenses are positioned such that the resultant main axis of the composite lens is located at a predetermined position with respect to the multifocal or near vision lens feature.

It is an additional object of the present invention to utilize a prism shaped lens as one of the thin plastic lenses that, when combined with another thin plastic lens, forms the composite lens.

SUMMARY OF THE INVENTION

The composite plastic lens includes an anterior plastic lens having a first corrective feature and a posterior plastic lens having a second corrective feature. One of the lenses, preferably the anterior lens, may have an optical center axis that is decentered with respect to the geometric center axis of the lens. That lens is prism-shaped. Both lenses are disposed atop one another such that when their optical center axes are combined, the resultant optical center axis or principal axis of the composite lens is at a predetermined position relative to the bifocal, multifocal or progressive lens feature carried by the anterior lens. The anterior and posterior lenses are joined together by an adhesive that bonds opposing, etched surfaces of those lenses. The method of making the composite plastic lens includes, in one embodiment, the steps of etching the front and rear surfaces of the posterior and anterior lenses and bonding those etched surfaces together with an adhesive. The adhesive is placed between the lenses while the lenses are angularly disposed with respect to the horizontal. Thereafter, the lenses are floated on a heated fluid to cure the adhesive. By heating the lenses prior to bonding, the posterior and anterior lenses return to their original shape and curvature.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a composite plastic lens and several methods of manufacturing that lens.

FIGS I and 3 respectively show anterior lens 10 and posterior lens 12. Anterior lens 10 is shown having a bifocal, trifocal or multifocal region 14. Anterior lens 10 could also be progressive vision lens.

Figure 1:
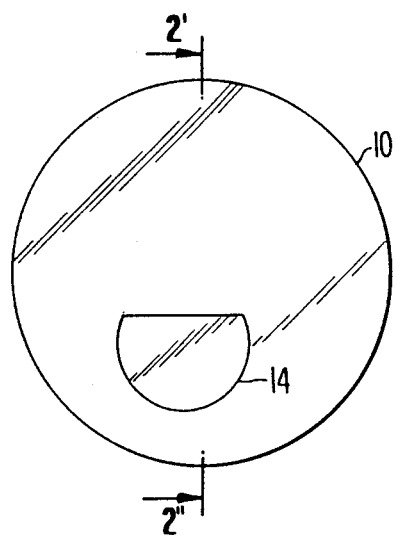
FIG. 1 illustrates a front view of an anterior plastic lens.
Figure 3:
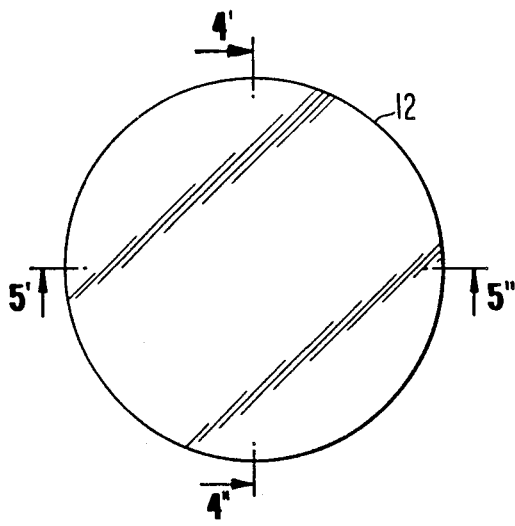
FIG. 3 illustrates a front view of the posterior plastic lens.
Figure 2:
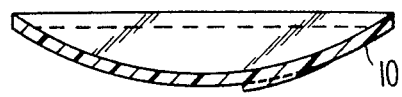
FIG. 2 illustrates a cross-sectional view of that lens from the perspective of section line 2'—2" in FIG. 1.
Figure 4:
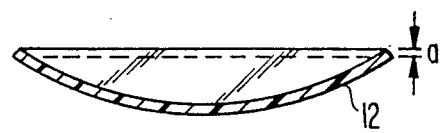
FIG. 4 illustrates a cross-sectional view of the posterior lens from the perspective of section line 4'—4" in FIG. 3.
Figure 5:
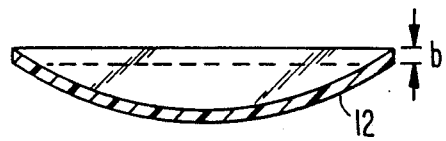
FIG. 5 illustrates another cross-sectional view of the posterior lens from the perspective of section line 5'-5" in FIG. 3.
Figure 7:
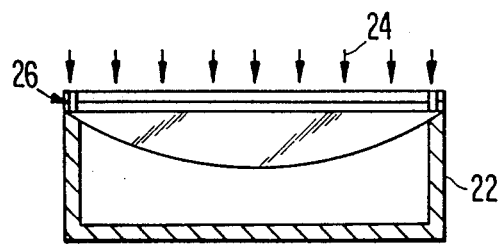
FIG. 7 illustrates another manufacturing step that could be used during the bonding of those lenses.

FIGS. 2 and 4, respectively, show cross-sectional views of those lenses from the perspective of section line 2'—2" and 4'—4'. With respect to posterior lens 12, that lens has an astigmatic corrective feature. Hence, it is a cylinder lens and distance a on the edge is greater than distance b on the edge shown in FIGS. 4 and 5. FIG. 5 shows a cross-section of that same lens from the perspective of section line 5'—5" in FIG. 3.

Figure 6:
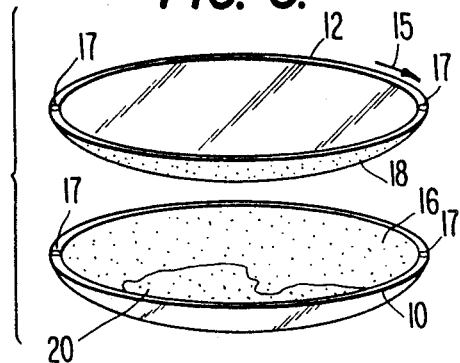
FIG. 6 illustrates a first method of manufacturing the composite lens that includes the rotation of the posterior lens with respect to the anterior lens. The figure also illustrates the etched or unpolished surfaces of those lenses.

FIG. 6 shows a first method of manufacturing the composite lens. Initially, the anterior and posterior lens are placed together and the posterior lens 12 is rotated about its optical axis, for example, in the direction shown by arrow 15 such that the correct prescription is obtained for the composite lens. The rotation is necessary to obtain a prescription astigmatic composite lens. Thereafter, indexing holes, such as holes 17, are drilled in the edge regions of both the anterior and posterior lens. Three indexing holes are drilled about the periphery of these lenses. Rather than drilling registration holes, the edges of the lenses are cut or filed to form registration notches. This latter procedure is the currently preferred method.

The rear surface 16 of anterior lens 10 and the front surface 18 of posterior lens 12 are etched. As used herein, the term "etched" refers to a process that removes the polish from rear surface 16 and front surface 18. This etching of the surface can be done by chemicals or by a mechanical means such as the use of emery paper. Number 400 sandpaper manufactured by Minnesota Mining & Manufacturing Company works well to etch the lenses. Thereafter, an adhesive or optical glue 20 is placed in the bowl of anterior lens 10.

In a first method of manufacturing the composite lens, the thin lenses are placed on a support such as block 22 and a force shown by arrows 24 is applied to the composite lens, designated as composite lens 26, to spread the glue evenly and remove the bubbles from the glue. During bonding, the composite lens is free standing, that is, supported only on the periphery to reduce stress on the lenses and provide a composite lens with no optical defects.

Figure 9:
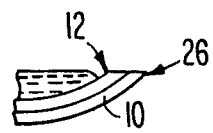
FIG. 9 illustrates a partial cross-sectional view of an edge of the lenses being bonded from the perspective of section lines 9'—9" in FIG. 8.
Figure 8:
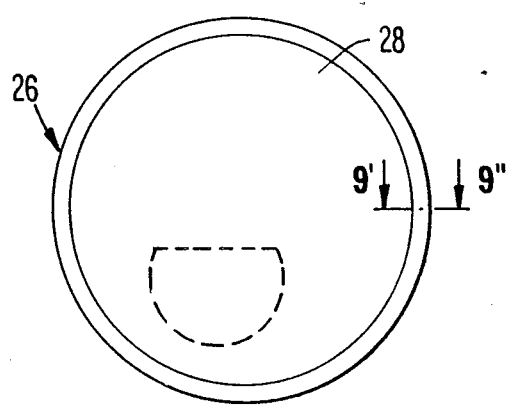
FIG. 8 illustrates a front view of one method of manufacturing the lens with a balloon of mercury on the lenses or water which applies pressure to the posterior lens.

FIG. 8 shows one method of applying an even force on the composite lens 26. This method utilizes a mercury balloon in central region 28 that covers substantially all of posterior lens 12. This is shown by viewing the cross-section in FIG. 9. Alternatively, the balloon may be filled with water instead of mercury. In any event, the liquid evenly disburses throughout the central region 28 of composite lens 26 and an even distribution of force is applied at least in concentric circles about the optical axis of both of the lens.

The glue should have an index of refraction equal to the index of refraction of the anterior and posterior lenses when the glue reaches maximum polymerization. Experiments have shown that composite plastic lenses that are glued together, without using the manufacturing step of etching, can be delaminated by a radially distributed force. However, when opposing surfaces of the anterior and posterior lenses are etched, the glue fills the microscopic scratches in the surface and bonds the two lenses together to such a degree that a person cannot delaminate the composite lens structure by the application of a radially directed force. An alternative method of manufacture utilizes only the weight of one thin lens rather than any additional forces. The force is the weight of the lens on top and is uniformly distributed over the lower, thin lens.

Use of a uniformly distributed force, that is, the weight of the top lens, evenly spreads the glue between the two lenses.

After the bonding step, the composite lens can be "edged" as known by persons of ordinary skill in the art such that the composite lens fits within the eyeglass frames selected by the patient. The composite lens can also have its outer peripheral edge grooved such that a wire can be placed in the groove to hold the lens in frames that are commonly called nylor frames. The edge can also be polished and, with this process, the composite lens looks like a single polished lens.

Figure 10:
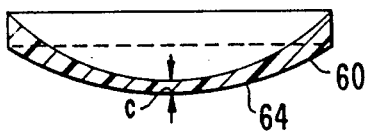
FIG. 10 illustrates a cross-sectional view of posterior, negative power lens having an astigmatic corrective feature.
Figure 11:
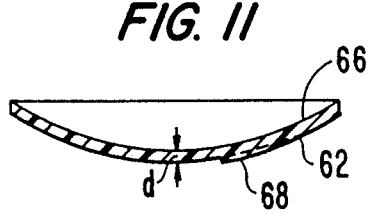
FIG. 11 illustrates an anterior lens.

FIG. 10 illustrates a negative power posterior lens 60. In addition to being a negative power, lens 60 is also a cylindrical lens which corrects for astigmatism. FIG. 11 is an anterior lens 62. One of the problems involved in laminating plastic lenses is that the central thickness of the composite negative lens should not exceed 2 millimeters. For example, if lenses 60 and 62 were bonded together, the thickness at the optical center would generally be the sum of distance c and distance d in FIGS. 10 and 11. Persons of ordinary skill in the art know that lenses can be molded with a 1 millimeter center thickness, that is distance c equals 1 millimeter. Therefore, distance c plus distance d could easily equal 2 millimeters which is acceptable for eyeglasses. Since the power of the negative lens depends upon the increasingly greater thickness of the lens at points towards the edge of the lens away from the optical axis, this 2 millimeter thickness limitation does not present a problem. The anterior or the posterior lens cannot usually be used independently as a corrective lens since they are too thin and flex too much. To combine lenses 60 and 62, lens 60 must be placed atop lens 62 and rotated to achieve the correct astigmatic correction by viewing the two lenses through a lensometer. Further, the front surface of posterior lens 60 must be etched and the rear surface of anterior lens 60 should be etched. Also, the curvature of front surface 64 is similar to the curvature of rear surface 66. Therefore, the surfaces are complementary in nature. Lens 62 could not be a stock lens that only includes a bifocal, trifocal or progressive lens characteristic in region 68 because of the thickness problem.

Figure 12:
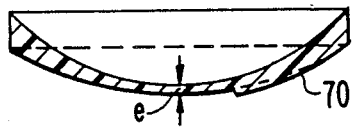
FIG. 12 illustrates a negative power, anterior lens.

FIG. 12 illustrates a cross-sectional view of an anterior lens 70. Lens 70 is a negative power lens that could be combined with lens 60 in FIG. 10. The distance e can be approximately 1 millimeter.

Figure 13:
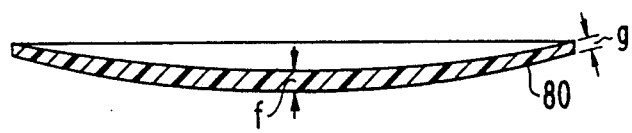
FIG. 13, illustrates a positive power, posterior lens.
Figure 14:
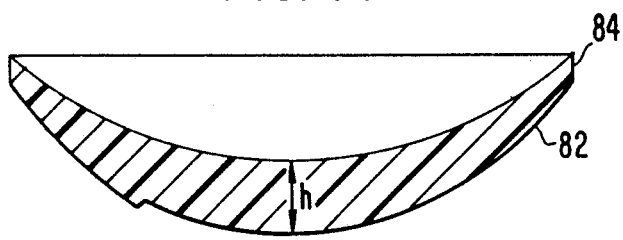
FIG. 14 illustrates a positive power, anterior lens.
Figure 15:
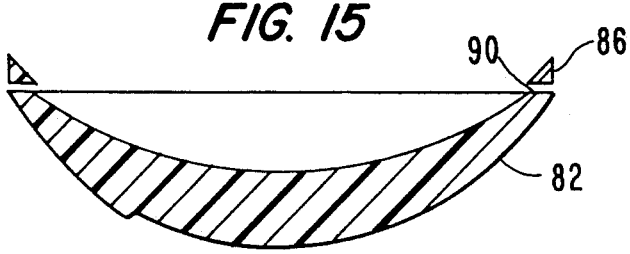
FIG. 15 illustrates a potential manufacturing step for the anterior lens shown in FIG. 14.
Figure 16:
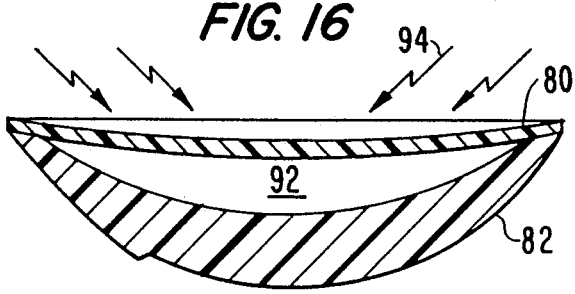
FIG. 16 illustrates another step that may be part of the method of manufacture and shows the bonding of the anterior and posterior lenses shown in FIGS. 13 and 15 with the use of ultraviolet light.

Lenses having a positive power present a different problem since positive lenses are thick at the optical center and thin at the edge. FIG. 13 shows posterior lens 80 and FIG. 14 shows anterior lens 82. Lens 80 is a positive lens since the thickness at the center f is greater than the thickness at the edge g. Lens 82 is a very powerful positive lens that, when combined with lens 80 provides a magnification of greater than +2.0. Hence, the sum of distances h and f determines the power of the lens along with the thickness at the edge of the lenses. However, the powerful lens 82 cannot be laminated to lens 80 because of curvature of peripheral edge region 84. Edge region 84 would cause lens 80 to be too thick. Therefore, FIG. 15 shows a manufacturing step wherein a peripheral edge segment 86 is cut or removed from the body of lens 82. The removal of edge section 86 results in a flattened periphery 90 of lens 82. The flattened periphery 90 will match the front curve of the posterior lens 80. Posterior lens 80 can then be placed atop lens 82 as shown in FIG. 16. An optical adhesive is placed intermediate the two lenses in space 92. One type of optical adhesive is cured by light, shown by arrows 94. This light may be in the ultraviolet wave length band. The UV light cures the adhesive placed in interspace 92. Other types of glue or adhesive can be used that polymerize with heat or other environmental conditions.

Figure 17:
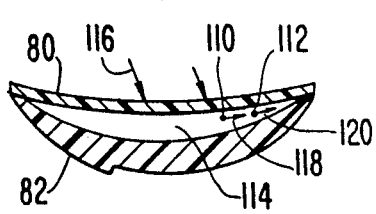
FIG. 17 illustrates the use of force to remove bubbles in the adhesive between the lenses as a step in one type of process.

A problem sometimes arises with the use of the optical adhesive. Particularly, bubbles 110 and 112, in FIG. 17, may be trapped in adhesive 114. To eliminate these bubbles, a force, generally shown by arrow 116, is applied to anterior lens 82 and posterior lens 80. Preferably, the force is the weight of the top lens. The bubbles can be moved in the direction shown by arrows 118, 120 and forced out of the adhesive.

Because the lenses are so thin, and particularly when bubbles are forced out of the adhesive, the shape of the thin lenses may be distorted, that is, the curvature of the lenses may be different than their original curvature resulting in a wavy composite lens configuration. Particularly when a thin lens, on the order of 1 millimeter in thickness or less, is handled, the curvature of the lens will change into a wave and that wave may be retained by the lens during the manufacturing process. If that wave remains in the lens after the bonding of the composite lens, the wave causes an optical wave to form in the finished product. Therefore, by looking through different sections of the lens, the image projected by the lens may be distorted.

Figure 18:
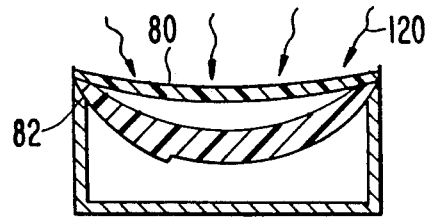
FIG. 18 illustrates the manufacturing step of using heat to cause the lenses to return to their original shape and curvature.

It has been discovered that when these thin lenses are heated to a certain temperature, their original shape returns. That is, the waves are removed by the application of heat. FIG. 18 shows lens 80 and lens 82 receiving heat that is shown by wavy arrows 120. The thin, plastic lenses have a memory that can be invoked by the application of heat. In one method of manufacturing, the lens is exposed to a temperature of be 65° C. for a period of about one minute.

Figure 19:
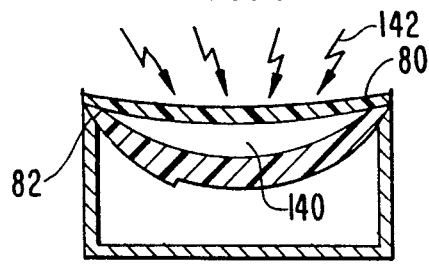
FIG. 19 illustrates the use of ultraviolet light after the heating step shown in FIG. 18.

FIG. 19 shows that after the application of heat, lenses 82 and 80 and glue 140 are subjected to UV light shown by items 142. This cures the glue causes it to reach complete polymerization. This manufacturing step is based upon the type of adhesive used in the process. If a different glue or adhesive is used, the application of UV light may be unnecessary.

As stated earlier, the adhesive at its maximum polymerization has an index of refraction equal to the index of refraction of the anterior and posterior lenses. The currently preferred type of adhesive used is in the allylic family, acrylic, epoxy family or urethane family of chemicals. Preferably, the adhesive or glue is in the same chemical family as the lens material. A compatible copolymer may also be appropriate. One type of adhesive is a plastic identified as CR39 by PPG Industries. The chemical name of this material is allyl diglycol carbonate which is polymerized with peroxide. Normally, 3 to 4% catalyst is added to this material to form a plastic item. It has been discovered that 6 to 8% catalyst enables this material to be used as an adhesive. The adhesive may set faster if up to 10% catalyst is added to the material.

One of the problems encountered in constructing the composite plastic lens involves placing the optical center axes of the anterior lens and the posterior lens in certain positions such that the resultant optical center axis or principal axis of the composite lens is in a correct position with respect to the bifocal, multifocal or progressive lens region. The correct placement of the principal composite lens axis is 5 millimeter above the bifocal, multifocal or progressive lens region and 1.5 millimeter inward towards the nose piece of the eyeglass. In general, this can be achieved by selecting an appropriate prism thin lens or by using two thin lenses and a lens meter and sliding one lens with respect to the other until the composite lens axis is at the right location vis-a-vis the bifocal, multifocal or progressive lens region.

Figure 20:
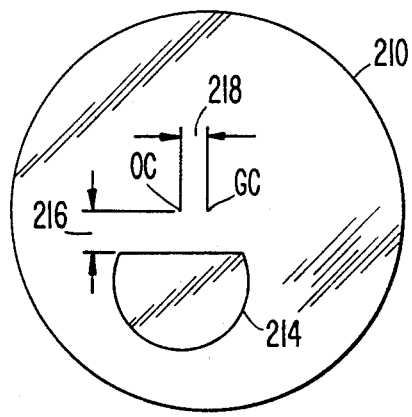
FIGS. 20 and 21, respectively, illustrate an anterior lens with an optical center decentered with respect to the geometric center of the lens and a posterior lens.
Figure 21:
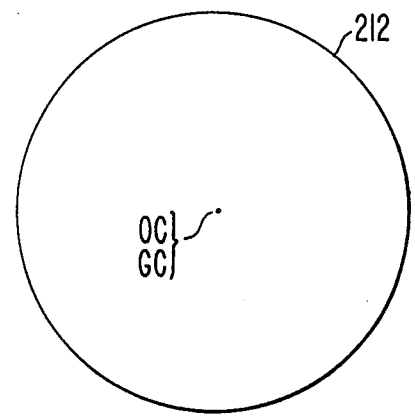

FIGS. 20 and 21, respectively, illustrate anterior lens 210 and posterior lens 212. Anterior lens 210 includes a bifocal area 214. Bifocal area 214 could be any type of near vision corrective lens feature, as appropriate. Anterior lens 210 has a optical center axis OC that is decentered with respect to the geometric center axis GC. The optical center axis of the lens is the axis normal to the lens and through the optical center of the lens. Preferably, the optical center axis of the composite lens is aligned with the pupil of the eye of the person wearing the eyeglasses when the person is viewing objects that are not normally viewed through bifocal, multifocal or progressive lenses. When making composite plastic lenses from two thin lenses, the decentering of the OC from the GC presents some problems. If lens 210 were a regular prescription thick lens, the optical center OC would be displaced 5 millimeters above bifocal region 214, distance 216, and displaced about 1.5 millimeters inboard or toward the nose of the eyeglass wearer, that is distance 218. With respect to posterior lens 21, the optical center and geometric center are substantially aligned on a single axis.

Figure 22:
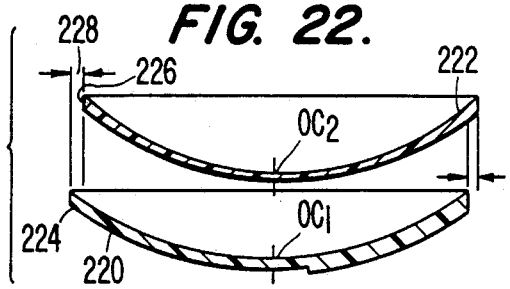
FIG. 22 illustrates alignment of the optical centers of two lenses.
Figure 25:
FIG. 25 illustrates the step of trimming the lens.

FIG. 22 illustrates the positioning of optical center $OC_1$ of anterior lens 220 with optical center $OC_2$ of posterior lens 222 to achieve the proper placement of the resultant OC of the composite lens. Positioning of $OC_1$ and $OC_2$ is achieved by use of a lens meter. In general, the lenses are marked. This may result in anterior lens 220 being slightly displaced with respect to posterior lens 222 such that edge region 224 protrudes beyond edge 226 by a distance 228. After lenses 220 and 222 are bonded together, this excess lens material 244 must be cut away as shown in FIG. 25. This results in an extra manufacturing step. Also, this manufacturing process may require thin lenses that are very large in size since one lens must be slid over the other. As used herein, the geometric center is defined as the center of symmetry of the lens structure.

Figure 23:
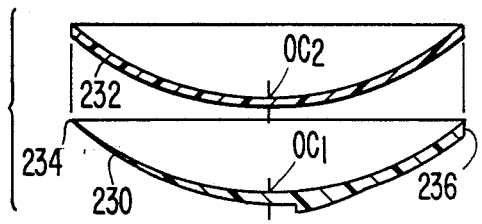
FIG. 23 illustrates alignment of the optical centers of a prism-shaped anterior lens and a posterior lens.

FIG. 23 illustrates anterior lens 230 and posterior lens 232. Anterior lens 230 is prism-shaped in that edge 234 is "sharp" while opposing edge region 236 defines a side edge that is thick as compared with edge 234. A "prism-shaped lens" is defined as a lens that has dissimilar, opposing edge side thicknesses. In other words, one edge is thicker than its opposing edge. The overall size of anterior lens 230 is substantially equivalent to posterior lens 232. Therefore, it is not necessary to trim one of the thin lenses making up the composite plastic lens. The prism lenses are cast with optical center axes located 5 millimeters up and 1.5 millimeters inboard. Hence, the principal axes are in the proper location vis-a-vis the bifocal region. The two thin lenses are placed in an appropriate set lens meter and the lens carrying the cylinder lens is rotated to the correct axis. Preferably, the front cast or anterior lens is a prism lens. When one of the thin lenses is not a prism lens, the optical center axis is positioned 5 millimeters above and 5 millimeters inboard of the bifocal region.

Figure 24:
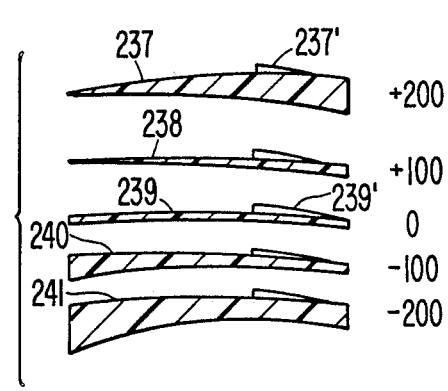
FIG. 24 diagrammatically illustrates a number of prism-shaped lenses.

FIG. 24 diagrammatically illustrates five different anterior lenses, each having a different spherical power. The dimensions of the lens in FIG. 24 are exaggerated to illustrate the prism-shape as well as the spherical power of the lens. Lenses 237 and 238 are positive lenses and have a spherical power of +2.00 and +1.00, respectively. These lenses also include a bifocal, multifocal or progressive lens region, for example region 237' on lens 237, that corrects for near vision reading problems. The balance of the lens corrects far vision problems. As used herein, far vision problems encompass hyperoptic and myopic eye corrections. Near vision lens 239 is a plano lens having a zero power but includes a bifocal, multifocal or progressive lens region 239'. Lenses 240 and 241 are negative lenses with spherical powers of −1.00 and −2.00, respectively. These lenses also include the corrective feature for correcting near vision problems. The lenses are prism-shaped in that the lens is molded to provide one edge that does not have the same thickness as the opposing edge of the same lens. Therefore, the positive lenses 237 and 238 have thicker edge regions on the right side of the drawing when compared to the edge regions on the left side of the drawing. The plano lens is not prism-shaped because its thickness is uniform throughout. The negative lenses are prism-shaped in that the left edge is much thicker than the right edge.

FIG. 25 illustrates lens 242 that has an edge region 244 cut away.

One method of casting a prism-shaped lens is to use a prism gasket. This causes one edge of the lens to be thicker when compared to the opposing or opposite edge of the lens. A method for casting plastic lenses is disclosed in U.S. Pat. No. 4,522,768 to Roscrow and that disclosure is incorporated herein by reference thereto.

Of course, there are many more combinations available since both the front cast lens and the back cast lens can contribute to the overall spherical power of the composite lens. Accordingly, the front cast or anterior lens, that typically carries one of a bifocal, multifocal and progressive near vision feature, also typically carries a first part or a portion of the spherical corrective feature for vision correction of hyperoptic or myopic eyes. The back cast or posterior lens includes the second or the balance of the spherical corrective feature wherein when the first and second parts of both lenses are combined, a substantially complete vision correction for hyperoptic or myopic eyes is provided by the composite lens.

In the present optical lens system, the anterior or front cast lens preferably carries a bifocal, multifocal or progressive lens feature for presbyopic eyes. Further, the back cast or posterior lens carries an astigmatic corrective lens feature. That is, the back cast includes a cylinder lens. The cylinder lens is combined with an additional spherical power lens. It is possible that either lens may carry near vision (presbyopic eye corrective feature), far vision (hyperoptic or myopic eye corrective feature) or astigmatic vision corrective features. The claims appended hereto are meant to cover this variation.

To further illustrate the corrective features of each lens, the concept of anterior lens or front cast lens inventory is set forth in the following exemplary Front Cast Matrix.

| | FRONT CAST MATRIX | | | | | | | | |
|---|---|---|---|---|---|---|---|---|---|
| | ADD | | | | | | | | |
| Sph. | 1.00 | 1.25 | 1.50 | 1.75 | 2.00 | 2.25 | 2.50 | 2.75 | 3.00 |
| +2.00 | | | | | | | | | |
| +1.00 | | FC21 | | | | | | | |
| Plano | | | | | | | | | |
| −1.00 | | | | | | | FC45 | | |
| −2.00 | | | | | | | | | |

Lens FC21 corrective feature = +1.00 ADD 1.25
Lens FC45 corrective feature = −1.00 ADD 2.50

One of the problems encountered in combining two thin plastic lenses and constructing the composite lens is the wide choice of front and back or anterior and posterior lenses that can be selected to achieve the same composite lens. For example, assume that the composite lens must have a spherical power of +2.50. The following thin lens combination table illustrates that three different anterior and posterior (front cast and back cast) lens combinations can be used to achieve a composite lens having a spherical power of +2.50.

TABLE I

| | THIN COMBINATION | | |
|---|---|---|---|
| | Case 1 | Case 2 | Case 3 |
| Front Cast | +2.00 | +1.00 | +2.50 |
| Back Cast | +0.50 | +1.50 | Plano |
| Composite | +2.50 | +2.50 | +2.50 |

The identifier "FC21" refers to front cast spherical power classification 2 (+1.00) and near vision (presbyopic) corrective feature class 1 (ADD 1.25). Lens "FC45" has a spherical power of −1.00 and an ADD or near vision corrective feature of 2.50. Lens FC53 is a −2.00 ADD 1.50 lens. Of course, there can be many more classes of front casts since the spherical power can be set at increments of 25. A plano or zero power lens, FC37, carries just the near (presbyopic) vision corrective feature (Plano ADD 3.00).

The back cast or posterior lens inventory chart is more complex in that the spherical power varies by increments of 0.25 and the cylinder varies by increments of 0.25. The following is an exemplary Back Cast Matrix.

| | BACK CAST MATRIX | | | | | | | |
|---|---|---|---|---|---|---|---|---|
| | Cylinder | | | | | | | |
| Sph. | −0.25 | −0.50 | −0.75 | −1.00 | −1.25 | −1.50 | −1.75 | −2.00 |
| +2.00 | | | | | | | | |
| +1.75 | | | | | | | | |
| +1.50 | | BC3.2 | | | | | | |

-continued

| | BACK CAST MATRIX | | | | | | | |
|---|---|---|---|---|---|---|---|---|
| | | Cylinder | | | | | | |
| Sph. | −0.25 | −0.50 | −0.75 | −1.00 | −1.25 | −1.50 | −1.75 | −2.00 |
| . | | | | | | | | |
| . | | | | | | | | |
| +0.25 | | | | | | | | |
| 0 | | | | | | | | |
| −0.25 | | | | | | | | |
| . | | | | | | | | |
| . | | | | | | | | |
| −1.75 | | | | | | | BC16.7 | |
| −2.00 | | | | | | | | |

Lens BC3.2 corrective feature = sph. +1.50 cyl. −0.50
Lens BC16.7 corrective feature = sph. −1.75 cyl. −1.75

Back cast lens "BC3.2" refers to a back cast having a spherical classification of 3 in the matrix (+1.50) and a cylinder power class of 2 (−0.50 cylinder). Lens "BC16.7" refers to a class 16 spherical power (−1.75) and a class 7 cylinder power (−1.75). The Front Cast Matrix and Back Cast Matrix only provide exemplary illustrations of a lens inventory that can be used to construct the composite plastic lens. For example, FC21 and BC3.2 could be combined to achieve a lens having the following prescription:

COMPOSITE LENS
+2.50 − 0.50 AXIS _ ADD 1.25

Since the back cast lens is a cylinder lens, the prescription must include an angle at which the cylinder axis must be disposed off the horizontal. Therefore, the prescription is faulty in that an axis is not provided. The axis is measured from a horizontal position on the lens. Accordingly, the astigmatic lens correction is determined by a spherical power and the angular displacement of the cylindrical lens off an axis 0°-180° or along a horizontal. The following optical formula is used to determine the spherical power of a cylindrical lens at an axis a° displaced from the horizontal.

OPTICAL FORMULA
$Sph._{180} = (Sph.) + (Cyl.)(\sin a)^2$ where  $Sph._{180}$ = Spherical Power of Cylinder Lens at 180°
 Sph. = Spherical Power of Prescription
 Cyl. = Cylinder of Prescription
 a = Number of degrees cylinder must be rotated to correct for astigmatism For example, if the prescription calls for +3.00/−1.00 axis 45° ADD 1.75, the spherical power of the composite lens at 180° is determined by the foregoing equation. $Sph._{180}=(+3.00)+(−1.00)$ (sin 45°)$^2$=+2.50. Ideally, in order to make the composite plastic lens, a front cast having a spherical power of +2.50 and a near vision corrective feature of ADD 1.75 would be selected. The back cast would be plano (0 spherical power) with a −1.00 cylinder.

Generally, one method of manufacturing involves taking one of the lenses, putting that lens in a lens meter and setting the lens meter to the appropriate values, and marking the horizontal center line of the lens that extends through the optical center axis. Preferably, this is done with the posterior or back cast lens. In the above example, the lens meter is set to reflect the spherical power plano axis 45°. After the horizontal line is marked on the lens, which line passes through the optical center of the back cast, the lens is removed from the lens meter. The back cast is placed below the front cast and the horizontal line mark on the back cast is aligned in parallel with the bifocal upper lineal demarcation. The edges of both lenses are then cut or filed to form registration indicia or notches by an appropriate tool such as a saw or file. The front surface of the back cast is then etched and the back surface of the front cast is then etched. The lenses are then glued together in a manner that will be described hereinafter.

The optician or person assembling the composite lens must select an appropriate pair of front and back casts that will accommodate the required prescription. Using the same prescription +3.00/−1.00 axis 45° ADD 1.75, the following thin lens combination table shows various combinations that could be used to construct the composite lens.

TABLE II

| THIN LENS COMBINATION | | | |
|---|---|---|---|
| Prescription +3.00/−1.00 Axis 45° ADD 1.75 | | | |
| | Case 1 | Case 2 | Case 3 |
| Front Cast | +2.00 ADD 1.75 | +1.00 ADD 1.75 | Plano ADD 1.75 |
| Back Cast | +1.00/−1.00 | +2.00/−1.00 | +3.00/−1.00 |
| Composite | +3.00/−1.00AA | +3.00/−1.00AA | +3.00/−1.00AA |
| Where AA = Axis 45° ADD 1.75 | | | |

As stated earlier, in an ideal situation, the front cast would have a spherical power of +2.50 and the back cast would be plano/−1.00. However, assuming a limited inventory as set forth in the Front Cast Matrix and Back Cast Matrix described above, the composite could be constructed as identified above in Cases 1, 2 and 3. Case 1 is selected as the best alternative because the front cast of +2.00 spherical power is closest to the ideal situation where the front cast has a +2.50 spherical power. The reason for this selection is based upon the recognition that as the back cast is rotated 45° from the horizontal, the optical center of the composite lens changes. If the back cast incorporates a larger portion of the far vision (hyperoptic or myopic) corrective feature, when the back cast is rotated to 45°, the optical center moves further given the greater spherical power of the back cast lens. Therefore, Case 1 is preferable over Case 2 which is, in turn, preferable over Case 3.

The reason for respecting the optical center axis of the front cast, back cast and composite lens is to align the resultant optical center axis with the line of vision of the eyeglass wearer and to locate the axis 5 millimeters have and 1.5 millimeters inboard of the top edge of the presbyopic lens corrective feature. The optical centers of the front cast and back cast should be positioned such that the resultant principal axis of the composite lens is in the correct position. The optical formula identified above is used to calculate the ideal spherical power of the front cast. The person constructing the composite lens selects from the inventory a front cast having a power closest to the ideal power and then selects the compatible back cast to achieve a prescription eyeglass that is the best match to the precise vision correction or prescription.

Figure 26:
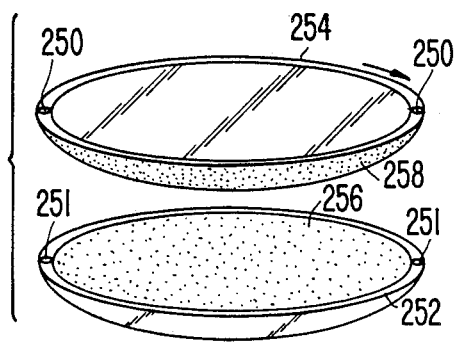
FIG. 26 illustrates a stage of the currently preferred, second method of manufacturing the composite lens.

If one of the thin plastic lenses is a prism lens and carries a near vision (presbyopic) correction (bifocal, multifocal or progressive), the optical center of the thin lens is preferably 5 millimeters above the upper periphery of the near vision correction feature 214 in FIG. 20, that is distance 216 is 5 millimeters, and the optical center OC is decentralized from the geometric center GC by 1.5 millimeters, that is distance 218. If the thin, front cast lens is not a prism lens as in FIG. 22, distance 216 to the OC is 5 millimeters and distance 218 is 5 millimeters inboard or toward the nose bridge from GC. When the front cast is a prism, the resultant optical axis of the composite lens is appropriately located at 5 millimeters and 1.5 millimeters by substantial vertical alignment of the two lenses. See FIG. 23. If the front cast lens is not a prism, OC is at 5 millimeters and 5 millimeters and it is necessary to bring back the optical center for the far vision (hyperoptic or myopic) toward the near vision (presbyopic) in the entire composite lens. One method of doing this is to use a lens meter and slide the back cast with respect to the front cast until the resultant optical center axis of the composite lens is positioned at 5 millimeters and 1.5 millimeters above and inboard of bifocal 214. Thereafter, one of the lenses can be trimmed as described above with respect to FIG. 22. Another alternative is to use a prism-shaped lens that has an optical center that is displaced from the geometric center at the proper location. In that situation, the selection of the front and back casts depend upon the amount of inventory of thin lenses as well as the formula and procedure described above. After substantially aligning the optical centers of the front and back casts, registry marks 250 and 251 are carved into front cast 252 and back cast 254 shown in FIG. 26. The rear surface 256 of front cast 252 is etched and front surface 258 of back cast 254 is etched.

The etched lenses are then cleaned with water and acetone and dried with a silk brush under a dust free hood, clean hood or booth. The lenses are then placed atop each other according to the registration marks 250 and 251.

Figure 27:
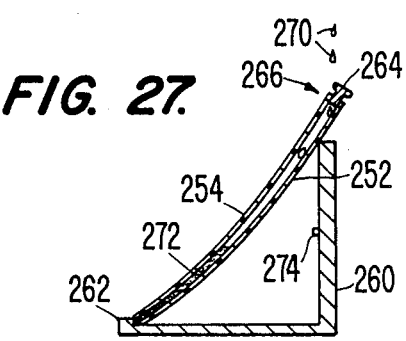
FIG. 27 illustrates the currently preferred method of placing adhesive between the lens and the apparatus therefor.

FIG. 27 shows the currently preferred method of manufacturing the composite lens wherein a cross-sectional view illustrates lenses 252 and 254 angularly disposed on stand 260. The stand is generally L-shaped with a lip 262 at the fore end of the base. A wedge 264 is placed between lenses 252 and 254 such that opposing edge portions of both lenses in upper lens region 266 are spaced a predetermined distance apart. That distance is dependent upon the width of the insertable tongue of wedge 264.

When disposed on stand 260, lenses 252 and 254 are angularly displaced with respect to the horizontal. Preferably, the lenses are disposed at about a 45° off horizontal. Adhesive is poured between the lenses, as shown by adhesive droplets 270. The adhesive flows down between the spaced apart lenses and accumulates at bottom lens region 272. Preferably, adhesive is placed between the lenses until the level of adhesive reaches sight line marker 274.

Figure 28:
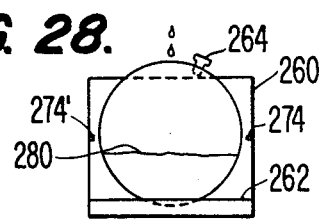
FIG. 28 illustrates a front elevational view of the method and apparatus shown in FIG. 27; and, FIG. 29 illustrates the currently preferred, second method of manufacturing that includes the step of floating the composite lens on a fluid to set or cure the adhesive.

FIG. 28 shows a front elevational view of stand 260 and this assembly stage of the composite lens. Adhesive level 280 preferably must reach the sight line shown between markers 274 and 274. By using this method of placing the adhesive between the lenses, air bubbles in the adhesive are removed and reduced, and eliminated, and a prescribed amount of adhesive is placed between the lenses. Preferably, the adhesive must reach a level that covers about 25% of the lenses.

Figure 29:
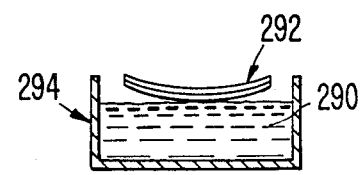

FIG. 29 shows one of the final stages of the currently preferred method of manufacturing the composite lens. After the proper amount of adhesive is placed between the lenses, wedge 264 is removed. The lenses then fall together by gravity thereby spreading the adhesive evenly between the lenses. No additional force is required to evenly spread the glue. The lenses are then removed from the stand and placed in a heated bath of fluid 290. The partially assembled composite lens 292 floats on the heated bath of fluid. The bath is heated to about 85°–95° C. At this temperature, the lenses return to their original shape and are bonded together. The density of the fluid must be high enough to allow both casts to float. One fluid having this characteristic is a water soluble oil, such as glycerin. In about 5–7 minutes, the adhesive bonds together.

It has been found that if the fluid is permeable to oxygen, the adhesive will not cure very fast. A preferred fluid of this type is silicone. However, any fluid that is permeable to $O_2$, has a high enough density to support the composite lens and has a boiling point greater than 100° C. may be used. When using this type of fluid, if the glue or adhesive drips or runs over the surface of the lens, such adhesive can be easily removed by scraping it with a fingernail. If glycerin is used, the errant adhesive may cure on the outside of the lens and be difficult to remove.

The glycerin, silicone or other fluid may be tinted such that the person constructing the lenses can see air bubbles in the adhesive. If the fluid is tinted blue, the bubbles appear white. The adhesive gels or sets in about two minutes. If the partially assembled composite lens 292 is withdrawn from bath 294 within the two minute gel time, the lenses can be taken apart and the glue can be cleaned from the etched surfaces. The procedure can then be repeated by cleaning the lenses and replacing the glue as discussed above.

Also, after about two minutes, the partially constructed composite lens 292 can be removed from the bath and any adhesive or glue spill-over can be cleaned off the lenses. In addition, the composite lens can be checked to determine that the lenses are still properly assembled. This may include inspection by a lens meter. If this further visual or lens meter inspection reveals that the lenses have a defect, the thin plastic lenses can be separated and the glue or adhesive cleaned with acetone and the front and back casts can be saved.

The claims appended hereto are meant to cover these and other changes within the scope and spirit of the present invention.

What is claimed is:

1. A lens for an eyeglass comprising:
   a thin anterior plastic lens having a first corrective feature and being prism shaped;
   a thin posterior plastic lens having a second corrective feature;

said anterior and posterior lenses joined together by an adhesive that bonds opposing, etched surfaces of said anterior and posterior lenses; and wherein said lenses, when joined, form a prescription lens incorporating said first and second corrective features.

2. A lens as claimed in claim 1 wherein said anterior lens has a first optical center axis and said posterior lens has a second optical center axis and said first and second optical center axes are disposed such that a resultant optical center axis of the composite lens is at a predetermined position relative to a presbyopic corrective feature on one of the formative lenses.

3. A lens as claimed in claim 1 wherein said adhesive has the same index of refraction as said anterior and posterior lenses.

4. A lens for an eyeglass comprising:
a thin anterior plastic lens having a first corrective feature, said anterior lens having a first optical center axis that is decentered with respect to a geometric center of said anterior lens;
a thin posterior plastic lens having a second corrective feature, said posterior lens having a second optical center;
one of said first and second corrective features including a presbyopic corrective feature;
said anterior and posterior lenses joined together by an adhesive that bonds opposing, etched surfaces of said anterior and posterior lenses, the first and second optical center axes being disposed such that a resultant optical center axis of the resulting composite lens is at a predetermined location relative to the presbyopic corrective feature; and
wherein said lenses, when joined, form a prescription lens incorporating said first and second corrective features.

5. A lens as claimed in claim 4 wherein said adhesive is in the same chemical family as said lens.

6. A lens as claimed in claim 4 wherein said anterior and posterior lenses are made of a chemical selected from the chemical family of allylic, acrylic, epoxy and urethane and said adhesive is selected from the same chemical family as said lens.

7. A lens for an eyeglass comprising:
a thin anterior plastic lens having a first corrective feature and being prism shaped, said first corrective feature including one of a bifocal, multifocal and progressive near vision corrective feature and further including a first part of a spherical corrective feature for one of a hyperoptic and a myopic vision defect;
a thin posterior plastic lens having a second corrective feature, said second corrective feature including a second part of said spherical corrective feature, wherein said first and second parts, when combined, provide substantially complete vision correction for said vision defect, said second corrective feature further including an astigmatic corrective feature;
said anterior and posterior lenses joined together by an adhesive that bonds opposing, etched surfaces of said anterior and posterior lenses; and
wherein said lenses, when joined, form a prescription lens incorporating said first and second corrective features.

8. A lens as claimed in claim 7 wherein said adhesive has the same index of refraction as said anterior and posterior lenses.

9. A lens for an eyeglass comprising:
a thin anterior plastic lens having a first corrective feature, said first corrective feature including one of a bifocal, multifocal and progressive near vision corrective feature and further including a first part of a spherical corrective feature for one of a hyperoptic and a myopic vision defect, said anterior lens having a first optical center axis;
a thin posterior plastic lens having a second corrective feature, said second corrective feature including a second part of said spherical corrective feature, wherein said first and second parts, when combined, provide substantially complete vision correction for said vision defect, said second corrective feature further including an astigmatic corrective feature, said posterior lens having a second optical center axis;
said anterior lens being disposed atop said posterior lens such that a resultant optical center axis of the resulting composite lens is at a predetermined position relative to said near vision corrective feature;
said anterior and posterior lenses joined together by an adhesive that bonds opposing, etched surfaces of said anterior and posterior lenses; and
wherein said lenses, when joined, form a prescription lens incorporating said first and second corrective features.

10. A lens as claimed in claim 9 wherein said adhesive has the same index of refraction as said anterior and posterior lenses.

11. A system for constructing a composite eyeglass comprising:
a thin anterior plastic lens having an etched back surface and a first corrective feature;
a thin posterior plastic lens having an etched front surface and a second corrective feature;
a stand for retaining, at an angular disposition, said anterior lens, said posterior lens and an adhesive poured between the facing etched surfaces of said anterior lens and said posterior lens when on said stand;
a bath of heated fluid in which said anterior and posterior lenses float such that said lenses are joined together by said adhesive and said adhesive bonds opposing, etched surfaces of said anterior and posterior lenses; and
wherein said lenses, when joined, form a prescription lens incorporating said first and second corrective features.

12. A system as claimed in claim 11 wherein said fluid is colored.

13. A system as claimed in claim 11 wherein said fluid is not permeable to oxygen.

14. A method of making a composite plastic lens comprising the steps of:
providing anterior and posterior lenses each having a corrective feature, said anterior lens being prism shaped;
providing an adhesive complementary to said lenses;
etching respective front and rear surfaces of said posterior and anterior lenses;
placing said adhesive between said front and rear surfaces of said lenses when said lenses are angularly disposed with respect to the horizontal;
raising the temperature of said lenses and said adhesive prior to the time said adhesive sets sufficient to cause said lenses to attain their original shape and curvature; and thereafter, bonding said lenses together with said adhesive to form a composite lens having a prescriptive characteristic that is a combination of said corrective features.

15. A method as claimed in claim 14 including the step of floating said lenses in a heated bath of fluid as part of said step of raising the temperature of said lenses.

16. A method as claimed in claim 15 wherein said lenses are disposed at an angle of about 45 degrees off the horizontal.

17. A method as claimed in claim 16 wherein said adhesive is poured between the lenses while opposing top edge portions of the respective lenses are spaced a predetermined distance apart.

18. A method as claimed in claim 17 wherein adhesive is poured between the lenses until the adhesive reaches a predetermined level with respect to the angularly displaced lenses.

19. A method as claimed in claim 15 wherein the step of floating includes identifying, by color contrast, air bubbles in said adhesive.

20. A method as claimed in claim 15 wherein said fluid is substantially impermeable to oxygen.

21. A method of making a composite plastic lens comprising the steps of:
providing anterior and posterior lenses each having a corrective feature, one of which is a presbyopic corrective feature, one of said lenses having a first optical center axis that is decentered with respect to a geometric center of said one lens and the other lens having a second optical center axis;
providing an adhesive complementary to said lenses;
etching a respective front and rear surface of said posterior and anterior lenses;
positioning said first and second optical axes when said anterior and posterior lenses are placed atop one another such that a resultant optical axis of the composite lens is at a predetermined position relative to said presbyopic corrective feature;
placing said adhesive between the etched surfaces of said positioned lenses when said lenses are angularly displaced with respect to the horizontal;
raising the temperature of said lenses and said adhesive prior to the time said adhesive sets sufficient to cause said lenses to attain their original shape and curvature; and, thereafter,
bonding said lenses together with said adhesive to form a composite lens having a prescriptive characteristic that is a combination of said corrective features.

22. A method as claimed in claim 21 wherein the step of raising the temperature includes floating the positioned lenses in a bath of heated fluid.

23. A method as claimed in claim 22 wherein the step of floating includes identifying, by color contrast, air bubbles in said adhesive.

24. A method as claimed in claim 22 wherein said fluid is substantially impermeable to oxygen.

* * * * *